(12) United States Patent
Getzinger (10) Patent No.: US 10,244,900 B2
(45) Date of Patent: Apr. 2, 2019

(54) CUTTING AND DISPLAY TRAY FOR CUTTING PROPORTIONAL SIZED PIECES OF PIZZA

(71) Applicant: Greg T. Getzinger, Hudson, OH (US)

(72) Inventor: Greg T. Getzinger, Hudson, OH (US)

(73) Assignee: Nuova Vita Corporation, Hudson, OH (US)

( * ) Notice: Subject to any disclaimer, the term of this patent is extended or adjusted under 35 U.S.C. 154(b) by 0 days.

(21) Appl. No.: 14/600,730

(22) Filed: Jan. 20, 2015

(65) Prior Publication Data

US 2015/0134571 A1    May 14, 2015

Related U.S. Application Data

(63) Continuation-in-part of application No. 12/932,296, filed on Feb. 22, 2011, now abandoned, and a continuation-in-part of application No. 13/555,942, filed on Jul. 23, 2012, now abandoned.

(60) Provisional application No. 61/339,139, filed on Feb. 22, 2010, provisional application No. 61/511,723, filed on Jul. 26, 2011.

(51) Int. Cl.
*A47J 47/00* (2006.01)
*G09B 19/18* (2006.01)
*G06Q 90/00* (2006.01)
*B26D 3/24* (2006.01)
*B26B 29/06* (2006.01)
*A47G 19/02* (2006.01)

(52) U.S. Cl.
CPC .......... *A47J 47/005* (2013.01); *A47G 19/022* (2013.01); *B26B 29/063* (2013.01); *B26D 3/24* (2013.01); *G06Q 90/00* (2013.01); *G09B 19/18* (2013.01); *Y10T 83/0524* (2015.04); *Y10T 83/8878* (2015.04)

(58) Field of Classification Search
CPC . Y10T 83/761; Y10T 83/762; Y10T 83/0524; Y10T 83/8878; A47J 47/00; A47J 47/005; A21D 13/007; A47G 19/022; B26D 3/24; B26B 29/063
USPC ........ 30/299–303; 99/537; D7/698; 269/295, 269/289 R, 293
See application file for complete search history.

(56) References Cited

U.S. PATENT DOCUMENTS

| | | | |
|---|---|---|---|
| 514,096 A | * | 2/1894 | Sheffield |
| 1,072,450 A | | 9/1913 | Hamblin |
| 2,906,020 A | | 9/1959 | Welsh |
| 3,060,838 A | | 10/1962 | Priore |
| 4,100,676 A | | 7/1978 | Ferguson |
| 4,189,132 A | * | 2/1980 | Di Russo .............. B26B 29/063 269/295 |

(Continued)

*Primary Examiner* — Phong Nguyen
(74) *Attorney, Agent, or Firm* — George W. Moxon, II; Brian P. Harrod (57) ABSTRACT

A food cutting guide comprising a base for supporting and cutting food, said base having first and second planar surfaces, a peripheral edge, and a plurality of cutting grooves formed in at least one of the planar surfaces to facilitate and guide the movement of a food cutting utensil in cutting the food, and at least one centering guide disposed inwardly from said peripheral edge on at least the planar surfaces having said cutting grooves; wherein said at least one centering guide facilitates the placement of the food in the center of the cutting surface; and wherein said plurality of cutting grooves are equally spaced to facilitate cutting equal size slices of food.

5 Claims, 7 Drawing Sheets

(56) References Cited

U.S. PATENT DOCUMENTS

| | | |
|---|---|---|
| D434,953 S | 12/2000 | Yu |
| 6,557,260 B1 | 5/2003 | Morris |
| 2005/0011074 A1 | 1/2005 | Mounce |
| 2007/0108170 A1 | 5/2007 | Costin |
| 2009/0019707 A1* | 1/2009 | Samuels ................ B26B 15/00 30/289 |

* cited by examiner

CUTTING AND DISPLAY TRAY FOR CUTTING PROPORTIONAL SIZED PIECES OF PIZZA

CROSS REFERENCE TO RELATED APPLICATIONS

This application is a continuation-in-part of, and claims the benefit of, U.S. patent application Ser. No. 12/932,296, filed Feb. 22, 2011, which is entitled "Method and System For More Accurately Determining Nutritional Values and Reducing Waste of Food Items," which claims the benefit of provisional application Ser. No. 61/339,139 filed Feb. 22, 2010, which is entitled "Method and System For More Accurately Determining Nutritional Values and Reducing Waste of Food Items" and are incorporated herein by reference; and is a continuation-in-part of, and claims the benefit of, U.S. patent application Ser. No. 13/555,942, filed Jul. 23, 2012, which is entitled "System Device And Method Of Using A Proportional Cutting Device To Cut Equal Size Slices Of Pizza," which claims the benefit of provisional application Ser. No. 61/511,723 filed Jul. 26, 2011, which is entitled "System Device And Method Of Using A Proportional Cutting Device To Cut Equal Size Slices Of Pizza" and are incorporated herein by reference."

BACKGROUND OF THE INVENTION

The invention is directed to a food cutting guide and more particularly to a pizza cutting guide to facilitate cutting equal size slices that ensure the nutritional values of the slices are equal, reducing waste of food and thereby increasing food section sales and sales profits.

Pizza shops or restaurants, especially "New York style" pizza shops, often sell pizza by the slice. These pizzas are sliced into large slices, for example, six large 60° angle slices. Customers select which piece to purchase, and, due to human nature, they will typically choose the largest slice to get the most for their money. This practice leads to the smallest pieces going unsold, being sold for a lesser price, or possibly being discarded, resulting in much waste and loss of revenue. On average, the 2 smallest slices out of every 6 slices, or ⅓ of pizzas by the slice, are thrown out. Ensuring that all 6 slices are the exact same size will reduce or eliminate the discarding of the smallest, unsold slices, and thus result in increased revenue and profits.

Often times, pizza is cut by hand and usually under the stress of time because the pizzas are hot and need to remain hot so that they can be delivered hot, as well as the usual stress of a business where time is money and tasks need to be done as quickly as possible. In cutting pizzas by hand, there is a desire to produce equal slices, but the lack of human skill and effort and the haste to get the job done lead to the achievement of less than equal slices.

Further, public and private schools, sports teams, booster clubs, children party centers, hospitals, nursing homes and institutions all have a need for pizzas and/or food items which are cut into equal slices for lunch programs, meals, fund raisers, and the like. When there are equal slices, there are fewer leftovers due to odd shapes or undersized or oversized slices. Thus, there is a need for a cutting guide to ensure that different size diameter pizzas (e.g., an 8 or 14 inch diameter pizza) can be cut into equal size slices.

There is also a need for determining the nutritional values of the food items, reducing waste of the food items and increasing profits of food item sales. Various prior art attempts have been made to develop products for cutting food items/segments/portions into equal slices and/or shapes. Some of those prior art devices have focused on a guide that holds the pizza, while others have focused on prior art devices for cutting the pizzas. However, all of those prior art attempts have various limitations and disadvantages, and the present invention provides an improvement over these prior art devices.

Some prior art devices have pointed protrusions, for example molded into the guide so that the pizza is held by the protrusions during the cutting process. However, these protrusions would hamper sliding the pizza off of the guide into a delivery box as often is required.

Further, nutritional studies indicate that many popular foods eaten in the US are wedge-shaped (e.g., pizza, cakes, and pies), and these foods affect the amount of saturated fat and sugar that are consumed by individuals and that they are associated with degenerative health conditions. Thus, it is important that amounts of wedge-shaped and other food sizes reported in food consumption surveys be as accurate as possible (See e.g., Journal of the American Dietetic Association, Mar. 14, 2006). However, the according to many scientific articles, standard techniques for measuring portion sizes of wedge shaped foods are often inaccurate and therefore the invention discussed herein can be used to eliminate many of those inaccuracies.

Notwithstanding these prior art devices for cutting equal pizza slices and related applications, there remains a need for method and system for determining nutritional values, reducing the waste of food items and increasing profits in the sale of food items utilizing an equal slice cutting device, and the like.

SUMMARY OF THE INVENTION

A food cutting guide comprising a base for supporting and cutting food, said base having first and second planar surfaces, a peripheral edge, and a plurality of cutting grooves formed in at least one of the planar surfaces to facilitate and guide the movement of a food cutting utensil in cutting the food, and at least one centering guide disposed inwardly from said peripheral edge on at least the planar surfaces having said cutting grooves; wherein said at least one centering guide facilitates the placement of the food in the center of the cutting surface; and wherein said plurality of cutting grooves are equally spaced to facilitate cutting equal size slices of food.

Accordingly, the present invention overcomes the limitations of the prior art by providing a method and system for more accurately determining nutritional values, reducing waste of food items and increasing profits by reducing waste of food items.

The present invention is to a unique and useful cutting guide or board having a system of grooves and concentric guides and a method for cutting equal size wedge or pie shaped, rectangular shaped, diamond shaped, or other regular geometric shaped slices of, for example, pizza, cake, pie, and the like. The cutting board of the present invention is such that it is simple to construct, relatively inexpensive to make and to use, easy to clean between uses, allows the centering of the pizza or food item on the cutting board and many other advantages mentioned below.

Consequently, the following presents a simplified summary of the invention in order to provide a basic understanding of some aspects of the invention. This summary is not an extensive overview of the invention. It is intended to neither identify key or critical elements of the invention nor delineate the scope of the invention. Its purpose is to present some concepts of the invention in a simplified form as a prelude to the more detailed description that is presented later.

It is an object of the present invention to provide a method and system for more accurately determining nutritional values of food items.

It is a further object of this invention to provide a method and system for reducing waste of food items.

It is an object of the present invention to provide a method and system for increasing profits of food items by cutting the food item into equal sizes to eliminate the potential rejection of smaller food items.

It is yet another object of this invention to provide a method and system for increasing profits from the sale of food items.

It is an object of the present invention to provide a cutting guide for increasing profits of food items by cutting the food item into equal sizes and to allow the food to be easily slid off of the guide into a delivery box or serving platter.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

One or more implementations of the present invention will now be described with reference to the attached drawings, wherein like reference numerals are used to refer to like elements throughout the drawings.

DETAILED DESCRIPTION OF THE INVENTION

The invention is directed to a food-cutting device which facilitates the cutting of food items such as pizza and thus reducing waste of food items, which results in larger profits. The device is a means for supporting the food item and guiding and facilitating the proportional cutting of the food, such as pizzas, pies, cakes, sandwiches (subs/submarine sandwiches/hoagies/etc.), garlic bread, yeast blocks, and other suitable foods, into equal proportions.

As used herein, "equal" slices does not mean 100% identical slices, since that is essentially impossible with unequal distribution of toppings, sauce, and cheese that comes with making food, especially pizzas. Rather, equal means the guide facilitates cutting consistent slices that visually appear to be of the same shape and size, with no slices being significantly or obviously the largest or smallest slice. It produces slices that are closer to identical and perfectly equal than can be achieved by cutting a pizza by hand using only one's eyes to approximate equal slices. It is the difference between drawing a circle freehand and drawing a circle using a compass; operator error with the compass can still produce a less than perfect circle, and a prodigy artist might produce a perfect freehand circle, but for the majority of people, using a compass will likely result in closer to a mathematically perfect circle than the person drawing one freehand. Likewise, the user of the present guide will produce more consistent and similar sized slices than a person using a knife freehand.

The cutting guide of the present invention can be used with a variety of cutting means or utensils, and so is not limited to any particular cutting utensil, for example, a roller blade, a knife, a rocker knife, and the like. The guide also can be used as a two sided pizza guide, for example, with various number of grooves on each one or both side, of the guide, and so does not require a user to have separate pizza guides (for example, comprising a six slice side, a ten slice side, a sixteen slice side).

In addition, the present invention provides a method or process for facilitating concession sales and institutional sales, but it also facilitates events and/or groups comprising fund raisers, pizza shops, pizza franchises, wedding planners, restaurants, hospitals, channels of dealers/distributors, schools, universities, nursing homes, caterers, and other groups that sell food items, known by those of skill in the art.

Figure 1:
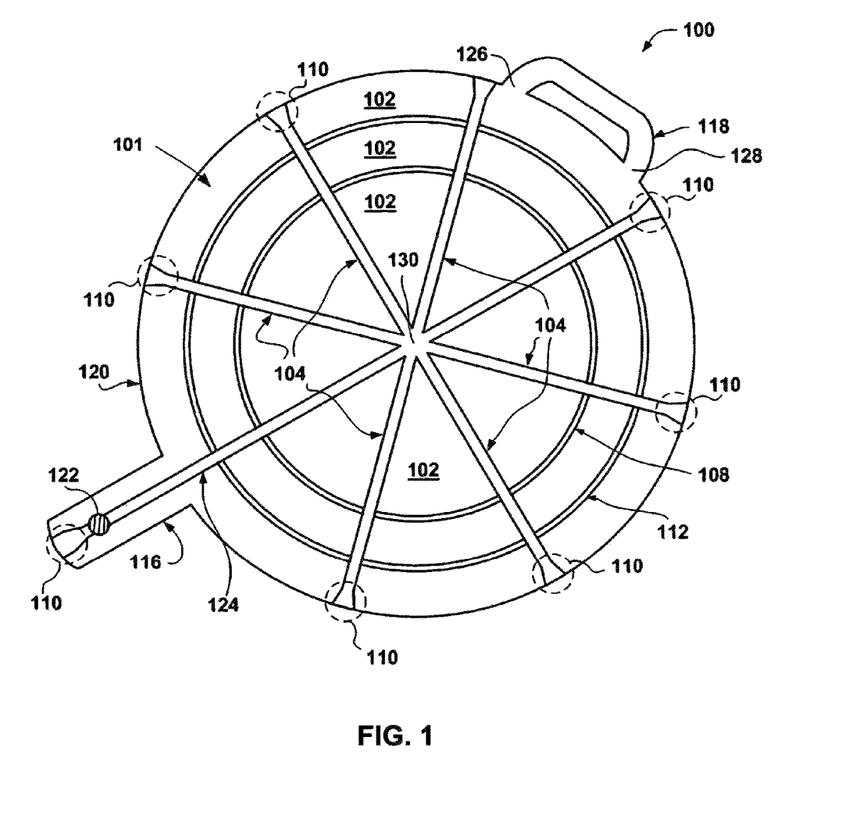
FIG. 1 is a top view of an embodiment of the invention.

The device comprises a base, which provides means for supporting and cutting food. As seen in FIG. 1, the present invention consists of a flat, circular guide body 120, although as discussed herein as wedge shaped 101 the guide body 120 can include other shaped groves comprising triangles, diamonds, rectangles (see FIG. 4), and the like. In this embodiment, the guide body 120, for example, can have a principal handle 116 and an optional supplemental handle 118. The body 120 has a plurality of grooves 104 to facilitate cutting of the pizza (for example) and a guide groove 124 can be is placed in the principal handle 116 to facilitate the beginning of the cutting process which leads to the equal proportioning of the food product. Although the body 120 is illustrated as a circular shape (FIG. 1) it can have any shape known by one of those of skill in the art, comprising an oval shape, a rectangular shape (FIG. 4), and the like. In addition, although the grooves are shown ending at the outer edge of the board the groove could be formed within the confines of the body 120, away from the outer edge of the body 120.

In one embodiment illustrated in FIG. 1, a pizza (not shown) can be placed on a first planar surface 102 of a proportional cutting guide 100 and a cutting tool can be used to slice and/or cut the pizza into equal pie-shaped segments as desired. The cutting tool can be, for example, a handle held pizza cutting wheel, a knife, a multiple handle rocker pizza blade (a shown), and the like. Beveled slots and/or cutting grooves 104, 108, 112, and 124, in FIG. 1A, for example, are formed, cut, routed, marked, or a combination thereof, and the like, into the first planar surface 102 of the guide 100 allowing the cutting tool to cut through the pizza.

Figure 2:
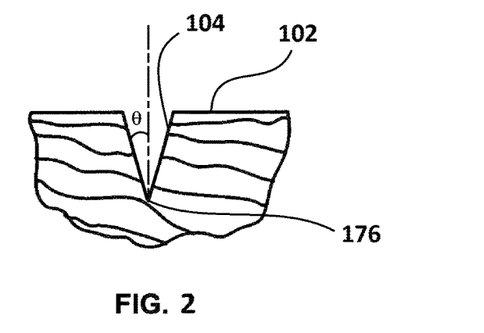
FIG. 2 is a partial cross sectional view of the present invention.

The cutting grooves 104 are self-centering, using a V-shape to insure the cutting device always lands in the valley of the V (See FIG. 2). This assures a consistent cut between pizzas, and provides equal sized slices. In the case of thick, or tall food items, such as garlic bread or cakes, the cutting grooves 104 are visual guide for aligning a knife, which will facilitate cutting equal sized portions.

The exact depth of the cutting grooves 104 is not critical, but it does require balancing the depth of the cuts with the thickness of the guide. If the guide is too thin, the grooves 104 will constitute a significant loss of material, thus leading to a fragile cutting guide. If the guide is quite thick, it will be able to support multiple, deep groves, but the guide itself will become heavy and unwieldy. Preferred groove cut depths are 0.09±0.025 inches and widths of 0.18±0.0625 inches, and guide or tray thickness of ⅜" to 5/16".

Because the grooves 104 are set into the base 102, the blade passes fully through the pizza, completely cutting separated slices, including the crust. This removes the hassle of having to hand-separate slices, usually by tearing apart a small bit of crust that holds two slices together. The guide herein facilitates cut-through.

The V-shaped grooves, or "V-grooves" 104 in the present invention are preferred over square grooved cutting boards. In the case of a square grooved board, when cutting pizzas with a rocker knife (a common tool pizza parlors), the user must stand nearly directly over the pizza when using the knife to insure that the knife stays centered in the grooves, and that they cut the pizza as evenly as possible. However, the V-grooves 104, because they are self-centering, provides flexibility since it does not require the user to stand in an exact position to cut pizzas, which is believed to allow the user to stand back when using a cutting tool, in a more comfortable position. This reduces fatigue and discomfort for employees.

The circular centering slots or guides 108 and 112 allow a user to center the pizza on the first planar surface 102 so that a pizza center and a device center 130 are properly aligned. The circular centering slots 108 and 112 are slightly larger in diameter than the diameter of the pizza to be cut. For example, if the pizza shop sells pizzas that are 8 inches in diameter the circular centering slot may be approximately 8.25 inches in diameter. For example, the centering guides 108, 112 can be positioned inwardly 0.5 to 4 inches in from the outer edge; that is, the diameter(s) of the centering guide(s) 108, 112 are set back, or are less than the diameter of the tray or guide 100 itself. The exact dimensions are not critical. A centering guide set in 3 inches from the edge is preferred, especially for smaller sized pizza oven paddles that are used with a rocker knife. The 3 inches allows room for the rocker knife to begin and end on the guide, whereas a smaller set-back centering guide 112 could lead to the rocker knife, in beginning or ending its cuts, to land on the table, which could dull the blade. Larger cutting guides or paddles, which tend to be heavier and wider (an important dimension since it could become wider than the door to the pizza oven), might use smaller set-backs for sake on convenience and weight. For example, an extra-large 16 inch pizza might only use a 1.5 inch set back centering guide. This leaves sufficient room for aligning the cutting device in the cutting groove prior to making contact with and cutting the pizza.

If the cutting guides 108, 112 were not set back from the edge, and the cutting guides were reduced to only the outer cutting guide 112 at or on the outermost edge of the tray, the device would have little to no usefulness, and would be essentially a plate. For instance, if the tray were large enough to hold the pizza, and feature the cutting grooves 104, the cutting guide 112 would be so far away from the pizza's edge that it would have to eye-ball the cut—to guesstimate—and the guide would be useless; no different than if there were no cutting guide in the first place. If the tray were smaller, such that the outer edge/cutting guide were close to the pizza's edge, the pizza could completely cover and obscure the cutting guide and cutting groove inlets or cutting groove entry guides 110, leaving the cutter to guess as to where to make the first cut, or leave little to no room for aligning the cutting knife. The entry guides 110 are flared openings at the terminal ends of the cutting grooves, designed to guide or funnel the cutting device into the cutting groove 104 to make beginning a cut easier. The entry guides 110 are located outside the largest of the plurality of centering guides 108, 112. The exact dimensions of the entry guides are not critical, but are have a larger opening that the cutting groove 104 and taper to the uniform thickness of the middle portion of the cutting grooves 104. A preferred width of the flared entry guides 110 is 0.323±0.02 inches and maintains the angle θ (FIG. 2) of the grooves 104.

Figure 4:
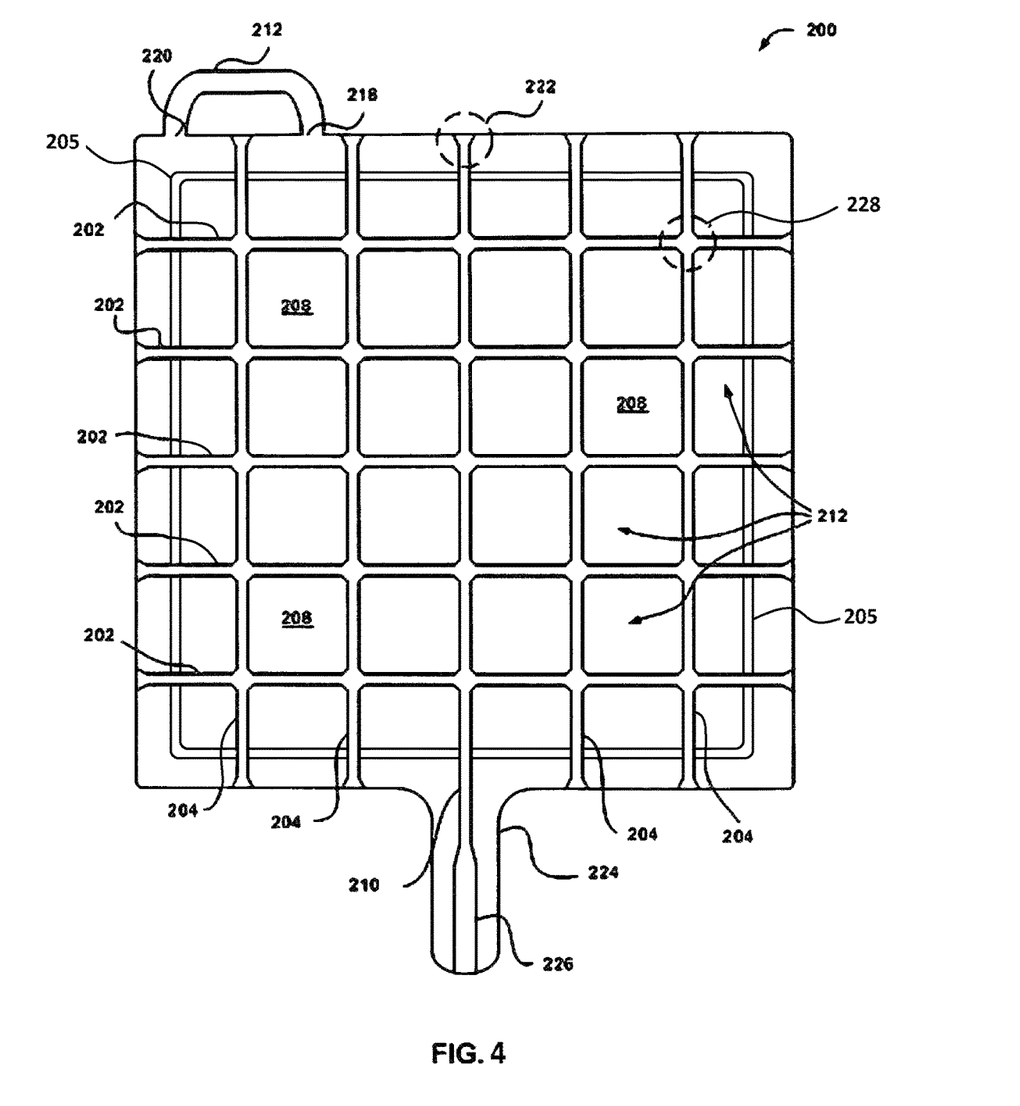
FIG. 4 is a top view of an alternate embodiment of the present invention.

Once sliced, the pizza may be served on the guide 100 or slid off onto a serving plate, platter, tray, cardboard delivery box, and the like. Although the circumferential slots 108, 112, are illustrated as being continuous, dashed or interrupted circumferential slots can be formed in the board to properly center the pizza. These circumferential slots are the centering guides 108, 112 and are centered on a focus of the intersection 130 of the cutting grooves 104. The focus is obvious since it is the intersection 130, but once a pizza is placed on the cutting guide, the focus is obscured and the pizza becomes hard to center absent any centering guide(s). Therefore, by adding the concentric centering guides 108, 112 mentioned supra, the inventor ensured that the pizza is properly centered in order to cut equal sections of pizza and provide the proportioning suggested for dietary control. This same idea applies for a rectangular cutting guide (FIG. 4). Since the cutting grooves 202, 204 intersect to form a grid, it can be difficult to locate a central focus on which to center a pizza. Thus, the addition of the centering guide 205, ensures the pizza is properly centered in order to cut equal sized slices. In addition, although the segments 101 are show as equal they can be two or more different sizes, for example, one slice large for adults and one slice smaller for kids.

In addition, though not shown letters or numbers can be cut, laser etched, and the like to indicate the diameter size in inches, millimeters, etc., at that location, for example. In addition, directions, recipes, artwork, cooking instructions, quotes, messages, individual names, company logos, and the like, can be cut, laser etched, burned, etc. into the first planar surface 102, or a second planar surface (not shown) of the proportional cutting guide 100. Also, the slots and/or grooves can be replaced by parallel ridges, elevated guides, and the like, and fall within the scope of this invention.

In this embodiment, the guide 100 is approximately circular in shape and may be constructed from a variety of materials comprising wood, such as ash, hickory, oak, walnut, maple and purple heartwood, chestnut, cheery; plastic, porcelain, metal, stone, wood composite materials, bamboo, recycled paper composite, Corian®, plastic composite materials, food safe materials and the like.

The food cutting guide of the present invention includes a base means for supporting and cutting food, the base having first and second planar surfaces, a peripheral edge, and a plurality of cutting grooves formed in at least one of the planar surfaces, and at least one centering guide disposed inwardly from said peripheral edge on at least the planar surfaces having said cutting grooves. The cutting grooves have a uniform width and a flared, opening at the terminal end of each of the plurality of cutting grooves to facilitate and guide the movement of a food cutting utensil in cutting the food, where the at least one centering guide facilitates the placement of the food in the center of the cutting surface. The plurality of grooves intersect and are equally spaced to facilitate cutting equal size slices of food, where the first and second planar surfaces have sufficient friction such that protrusions (for example spikes or a rim) are not necessary to stabilize the equal size slices and/or sections of food during cutting. The first and second planar surfaces have a friction means of sufficient friction to hold the food item and slices stationary during cutting, yet low enough friction to still allow the food to slide off for removal of the sliced food by sliding it off of the guide, for example when sliding a sliced pizza into a pizza box.

Figure 2A:
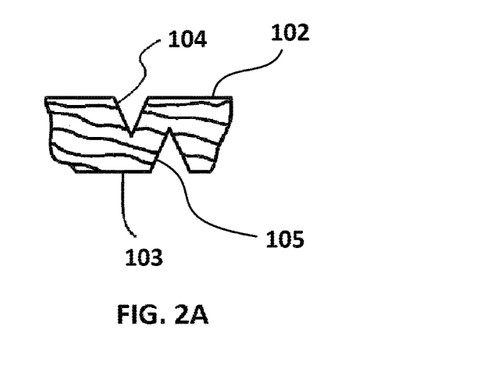
FIG. 2A is a partial cross sectional view of an alternate embodiment of the present invention.

The guide 100 can be manufactured utilizing a variety of techniques comprising CNC machining, routing, injection molding, rotational molding, blow molding, and the like. The guide 100 has a pair of substantially flat planar surfaces with the first planar face 102 and a second planar face 103 (FIG. 2A) parallel to the first planar face 102. The second planar face 103 can have a separate, second set of cutting grooves 105. Although the device is described with parallel faces the inventor(s) contemplated non-parallel planar surfaces and such embodiments are considered part of this invention so that the upper facing surface is at an angle when the device is sitting flat on a table.

The diameter of the guide 100 is sufficiently large to accommodate the pizza to be cut or proportioned. For example, the guide 100 may be large enough to accommodate pizzas ranging from four to sixteen inches in diameter. In addition, slots, marking and the like can be made on one or both planar surfaces, and the markings, slots and the like can be the same or different on either planar surface. In other words, the first planar surface can be used to cut eight equal slices whereas the second planar surface can be used to cut ten equal slices.

The guide 100 is sufficiently thick (e.g., ¼, ⅜ and ½ inches thick) so that the guide 100 remains substantially rigid after slots or cutting grooves 104, 108, 112, and 124 are created in the first planar surface 102 and/or the second planar surface (not shown) of the guide 100. The guide 100 shown in FIG. 1 is substantially uniform, however, the guide 100 of varying thickness designed to reduce weight, material costs, and the like would still be within the scope of the invention. In other words, the portion of the guide 100 where the cutting grooves are located could be the thickest portion of the guide 100 wherein the flanged portion between the cutting grove portions can have material removed so that the pizza remains relatively flat, such as honeycombed, grooves and the like and can be easily slid off the guide 100. In addition, through holes (i.e., lightening holes), and the like can be formed by removing material or molding the device to lighten the board for the end user. In addition, a very lightweight composite, such as an aluminum honeycomb sandwiched between two layers of material (e.g., plastic, composite, bamboo, etc.) could be utilized and all such devices are encompassed in the scope of this invention.

In the embodiment shown in FIG. 1 the first handle 116 is approximately rectangular in shape that can be utilized as a hand grip and a second handle 118 is offset from the first handle 116 and the second handle 118 connects to the guide 100 in two places 126 and 128. The first handle 116 and the second handle 118 can be offset (in other words not centered on the same line bisecting the circle) so they are not 180 degrees apart from the intersection's center 130, as shown, to allow the user to balance the guide 100 holding a pizza, for example, and thus prevent tipping. However, the guide may include a plurality of handles of a variety of shapes and sizes designed to support the weight of the pizza and still be within. the scope of the invention. The handles 116, 118 may be continuous with the device 102 as shown in FIG. 1, or they may be detachable and fastened with any known commercial fastening technique known to those skilled in the art such as glue, joints, fasteners, screws, nails, dowels, and the like. The handles 116, 118 may also be made of a different material than the device 102 and remain within the scope of the invention. For example, the device could be maple and the handle black walnut. In addition, the device could be a lamination of various materials including wood, plastic, composites, bamboo and the like.

The guide 100 illustrated in FIG. 1 is further defined by cutting slots or grooves 104, 124 that each bisect the approximately circular surface of the first planar surface 102 with an approximate outer circumference 120. The slots 104, 124 extend into the guide 100 a sufficient depth, for example one eighth of an inch, to allow the cutting tool to completely cut through the pizza placed on the first planar surface 102. FIG. 1 shows four slots 104 and 124 to cut eight equal pieces of pizza but is not intended to be a limit on a number of the slots formed in the guide 100. The slot 124 can bisect the first planar surface 102 running longitudinally through a center of the first handle 116, but it is not critical that a slot passes through the handle. In addition, the handle 116 has a through hole 122 for hanging the device from a hook, for example or for attaching a cord, leather strap, etc.

The initial slot non-fixedly holds the pizza to the first planar surface 102 because the pizza forced into the slot 124 during the cutting process prevents from the pizza from rotating during subsequent cutting operations.

FIG. 2 illustrates the slots/grooves 104, 124 shown in FIG. 1. The slot has symmetrical angled sides, which meet at a valley 176, forming a V-shape. These V-shaped cutting grooves force the cutting blade to fall to the valley at the groove's center. Thus, the grooves are self-centering, which results in consistent, precise cuts. The sides of the V-grooves have an angle θ (theta) in a range of 30° to 60° measured from the vertical, or 60° to 120° measured between the angled sides of the V-groove. The preferred angle θ is 45° (or 90° when measured from side-to-side).

Figure 3:
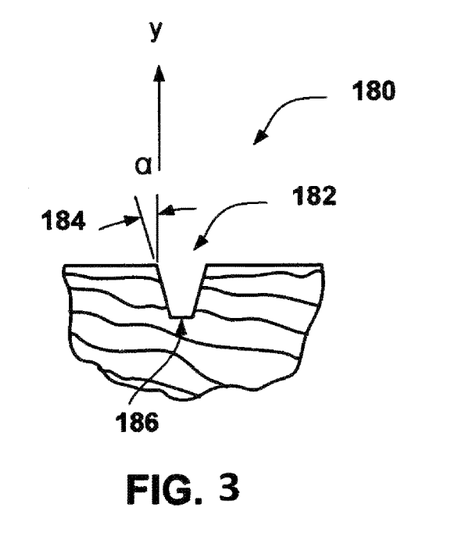
FIG. 3 is a partial cross sectional view of an alternate embodiment of the present invention.
Figure 3A:
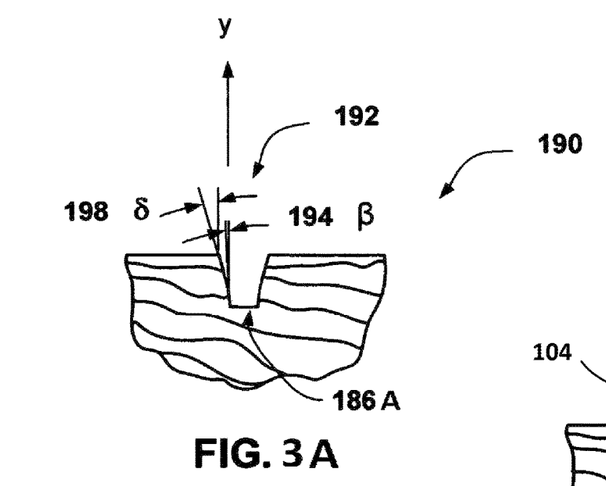
FIG. 3A is a partial cross sectional view of an alternate embodiment of the present invention.
Figure 3B:
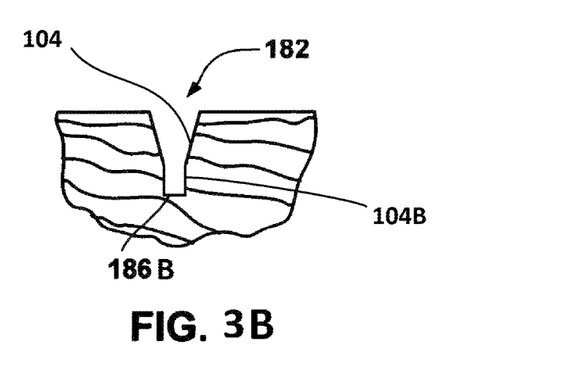
FIG. 3B is a partial cross sectional view of an alternate embodiment of the present invention.

As used herein, "V-groove" or "V-shaped groove" includes grooves with angled sides meeting at a point/valley 176, as shown in FIG. 2, as well as grooves with angled sides that end in a flat bottom 186, 186A, as shown in FIGS. 3 and 3A, and grooves with angled sides 104 that narrow to a rectangular slot 104B having a flat bottom surface 186B, as shown in FIG. 3B. It is the angled sides that join with the surface 102 of the guide that define the V-shape, since the angled sides facilitate the self-centering of the cutting tool in the grooves.

FIG. 3 further illustrates the slots/grooves 104, 124 illustrated in FIG. 1, with another embodiment 180 wherein a slot 182 with a beveled edge where the angle a 184 is, for example, approximately between 5 and 10 degrees and the bottom of the slot 186 is cut parallel with respect to the first planar surface 102 (FIG. 1).

FIG. 3A illustrates yet another embodiment 190 of a slot/groove 192 as having a compound angle with angle β (beta) 194, located adjacent to the bottom of the slot 196, and angle δ (delta) 198, closest to the first planar surface 102, measured from the vertical y axis, as shown, where the total combined angle is between 5 and 15 degrees, for example. The scope of this invention includes slots of other shapes and sizes including a continuous curve, various arcs, compound angles, concave shapes and the like. One skilled in the art recognizes that when a blade is directed toward the bottom of a slot and away from the side edges it thereby reduces the wear on the device/guide, as illustrated in the prior art devices, for example, where the side walls of the groove are parallel. Routing, cutting, and making grooves of various sizes and shapes is well known by those of skill in the art and all such sizes and shapes are contemplated and part of this invention.

FIG. 4 illustrates a rectangular slot design where a first planar surface 208, has a plurality of slots 202, 204 and 210 in the first planar surface wherein the plurality of slots 202 and 204/210 are substantially perpendicular to each other and the parallel plurality of slots 202 and/or 204/210 are equally spaced apart. The plurality of slots 202, 204 and 210 allows the user to subdivide the pizza into a plurality of substantially equal-sized square shaped pizza slices 212. For example, the slots 202, 204 and 210 may be cut into the first planar surface 208 at, for example, four inch intervals creating portions that are four inch square. While this embodiment teaches this design, the scope of the invention is not limited to parallel and perpendicular slots of equal spacing. Any desirable slot design may be created in a planar surface of any shaped device such as other geometric or decorative shapes including diamonds, triangles, rectangles, and the like. Additionally, the shape of the proportional cutting device may be circular, square, rectangular, or any other shape desirable to a user. A bevel 222 can be cut, routed and the like into the beginning of the slots 202 and 204 to guide the cutting tool more easily into the slots 202 and 204. In addition, an elongated beveled slot 226 can be formed into a first handle 224 so that the cutting tool is more easily guided toward the pizza, for example thereby causing less or eliminated premature wear on the device 200. A second handle 212 can be formed as part of the device 200 attaching to the device 200 at a first location 220 and a second location 218, for example. The guide/tray features a centering/alignment guide 205, which is used to properly orient the pizza (or other food) on the tray to reap the benefit of the cutting grooves 202, 204.

Figure 5:
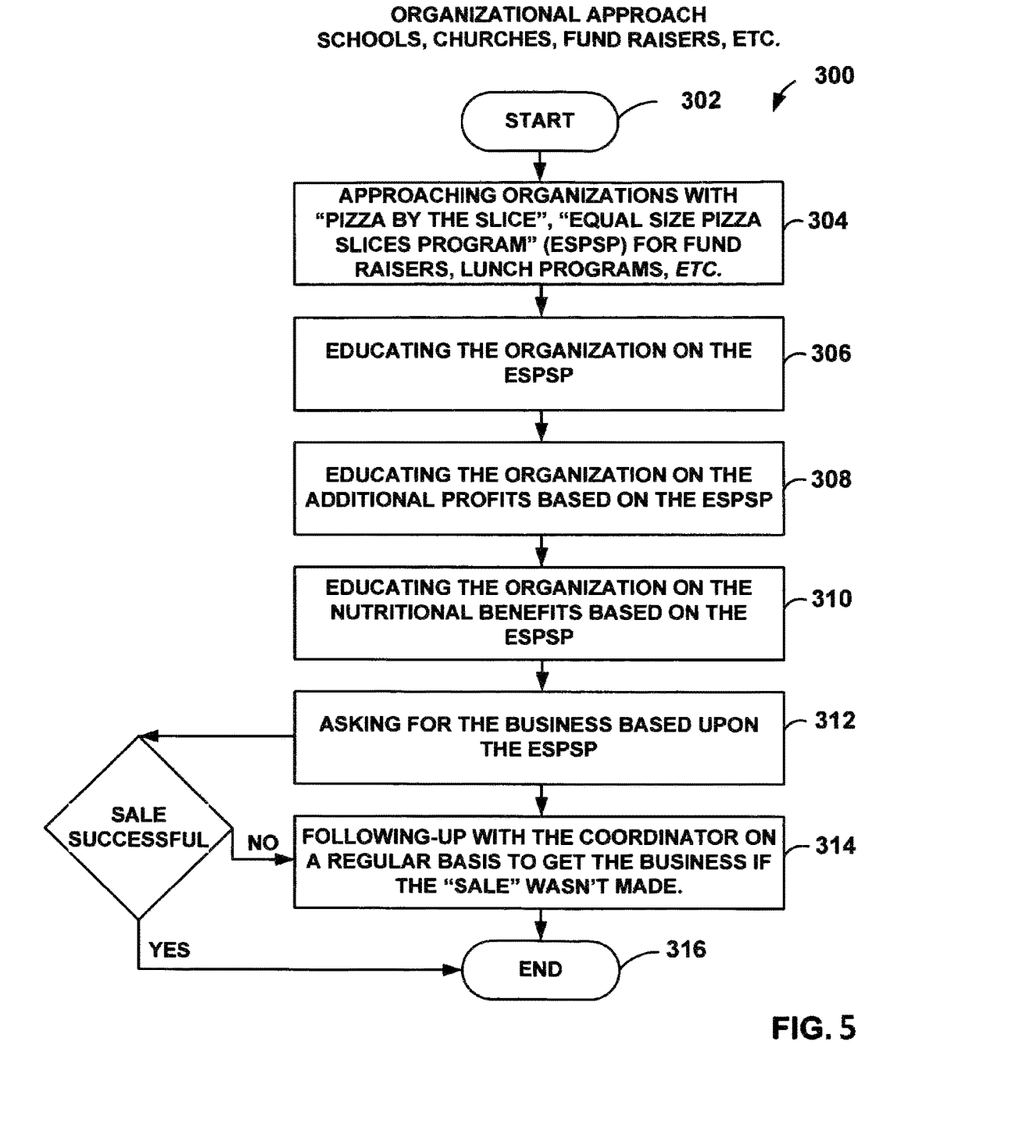
FIG. 5 is a flow diagram illustrating a method and system for approaching organizations to help them more accurately determine nutritional values and reduce waste of food items utilizing the food cutting guide.

Illustrated in FIG. 5 is a method 300 and system for more accurately determining nutritional values, reducing waste of food items and increasing profits based on the reduced waste which results in larger profits to various individuals, businesses, non-profit organizations, for-profit organizations, and the like. The exemplary method 300 can utilize a proportional cutting guide 100 (FIG. 1A) for cutting a pizza, for example, into equal size slices, according to one or more aspects of the present invention. The method will be described with respect to FIGS. 1A-1D and FIG. 2.

These embodiments are described in sufficient detail to enable those skilled in the art to practice the invention, and it is to be understood that the embodiments may be combined or that other embodiments may be utilized and that changes may be made to the invention without departing from the spirit and scope of the present invention.

The exemplary method 300 may be advantageously employed in association with pizza; however the method is not limited to pizza but applies to cakes, pies and other suitable food items. The method 300 begins at 302, wherein at 304 an individual/pizza promoter, such as a pizza shop owner, a pizza franchise general manager, approaches an organization, for example, with a "pizza by the slice" program for fund raisers wherein the pizza promoter's business purchases and resells equal size slices of pizza.

At 306 the pizza promoter/seller/franchise, for example, can approach a local private school with the goal to meet with a food service coordinator. At 306 the pizza promoter should determine whether the food service coordinator already has a current pizza provider and if she/he does it is critical to determine what problems the food service coordinator is having with the current pizza provider. If the private school has a current pizza provider at 306 the promoter/seller/franchise should educate the food service coordinator or organization on the numerous benefits involving the "equal size pizza slices program" (ESPSP) for fund raisers, lunch programs, etc., for example increased profits, better understanding of nutrients, etc.

The method 300 proceeds to 308 wherein the pizza promoter determines if there are pizza portion problems. Even if the food service coordinator says there is not a problem with portion size this is the point when the pizza promoter shows the proportional cutting guide 100 and discusses the reduced food waste benefits resulting in increased profits. If the coordinator does not know the profit numbers, this is the time to educate them on the profit potential of the program. Do not be surprised if the coordinator has no idea of what the profits are on pizza sales. What follows is an exemplary profit analysis based upon four 14 inch diameter pizzas cut into 8 equal slices; however various diameter pizzas as well as various numbers of slices are contemplated herein.

For example, this example illustrates a profitable venture to sell pizza by the slice for lunch on Fridays, to the students. In order to maximize the profits it is critical to cut the pizza into equal size slices. It has been shown that smaller pieces of pizza in a pizza pie will often not be purchased or avoided, thereby resulting in waste of food, having to be thrown away and loss of profits because those smaller pieces cannot be sold. The wasted food and the loss in profits can be substantial over time.

The method 300 proceeds to 310, where the pizza promoter determines if the coordinator is satisfied with the profit from sales of the pizza. If the coordinator is satisfied the promoter asks the coordinator for the pizza business at 312. If the sale is not successful, the promoter should follow-up with the coordinator on a regular basis to get the business if the "sale" wasn't made.

A major advantage of the "pizza by the slice" program is that nutritional studies indicate that many popular foods eaten in the US are wedge-shaped (e.g., pizza, cakes, and pies), and these foods affect the amount of saturated fat and sugar that are consumed and that they are associated with degenerative health conditions. Thus, it is important that amounts of wedge-shaped foods reported in food consumption surveys be as accurate as possible (See e.g., Journal of the American Dietetic Association, Mar. 14, 2006). However, the standard techniques for measuring portion sizes of wedge shaped foods are often inaccurate and therefore the method 300 discussed herein can be used to eliminate those issues. One has only to look at Michele Obama's program on fighting childhood obesity to understand how important it is to be able to measure size portions properly and therefore determine nutritional content, calories, and the like.

Figure 6:
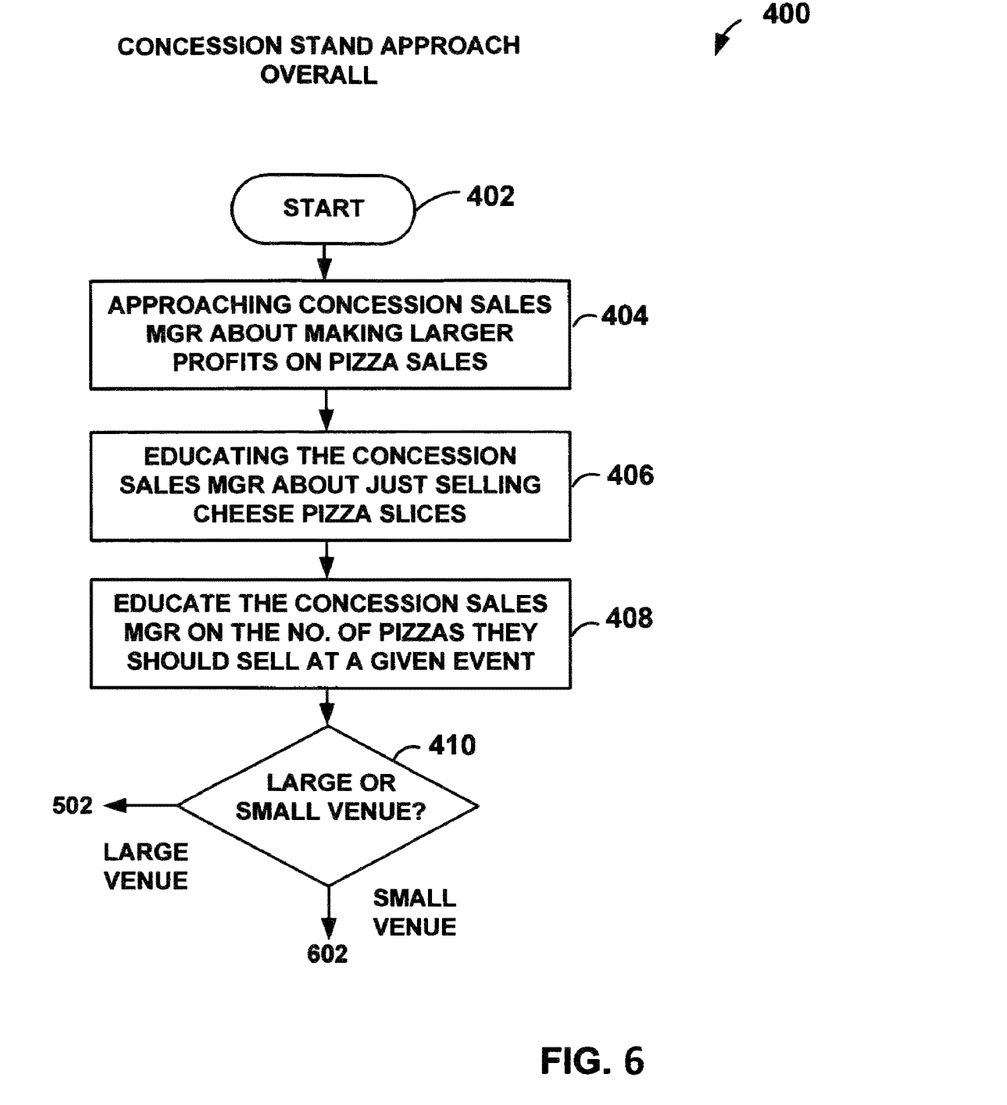
FIGS. 6-8 is a flow diagram illustrating a method and system for approaching concession sales managers to help them more accurately determine nutritional values, reduce waste of food items and increase profits utilizing the food cutting device.

Illustrated in FIG. 6 is a method 400 and system for promoting the "pizza by the slice" program for driving profits at concession stand sales. Many if not most concession stands are run by parents of students that are volunteering their time. They often do not know how much pizza to order, what is a good price point to sell pizza slices and how much to pay for pizza pies. The method 400 begins at 402 and at 404 a pizza promoter approaches a concession stand manager/parent regarding a fundraiser. The decision maker is most often not the person manning the concession stand. Treat concession stand sales as a commercial account and consult with the decision maker on how many pizzas to order and how much they will make in profit per pizza. Pizza by the slice can be one of the most profitable items sold at the concession stand. If done properly by the promoter's business the fundraiser does not have to worry about making the pizza, cutting the pizza, picking up the pizza, waste or leftovers, rather the decision maker/concession manager can focus on cash flow and profits.

At 406 the promoter should convince the concession sales manager to just sell cheese pizza slices rather than other pizza combinations, e.g., cheese and pepperoni, etc. Concession stands frequently offer cheese and pepperoni and other combinations by the slice at the concession stand, but simpler is better and more profitable and that means selling cheese only pizzas. If you try to sell cheese and pepperoni; and cheese pizzas, for example, it is inevitable that one or the other will run out first. After running out of one item, anticipating how much to order for the remainder of the game will more than likely, result in left over pizza and additional costs for delivery and tip charges.

Figure 7:
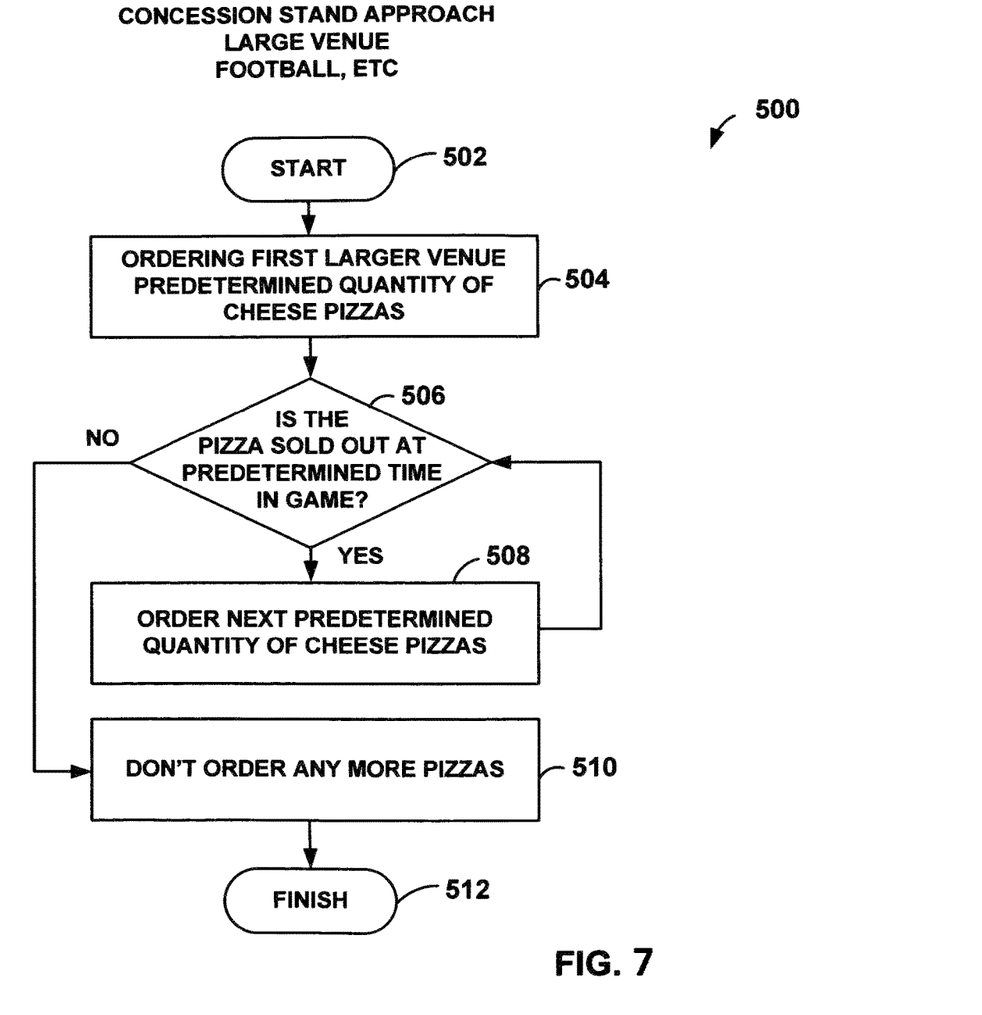
Figure 8:
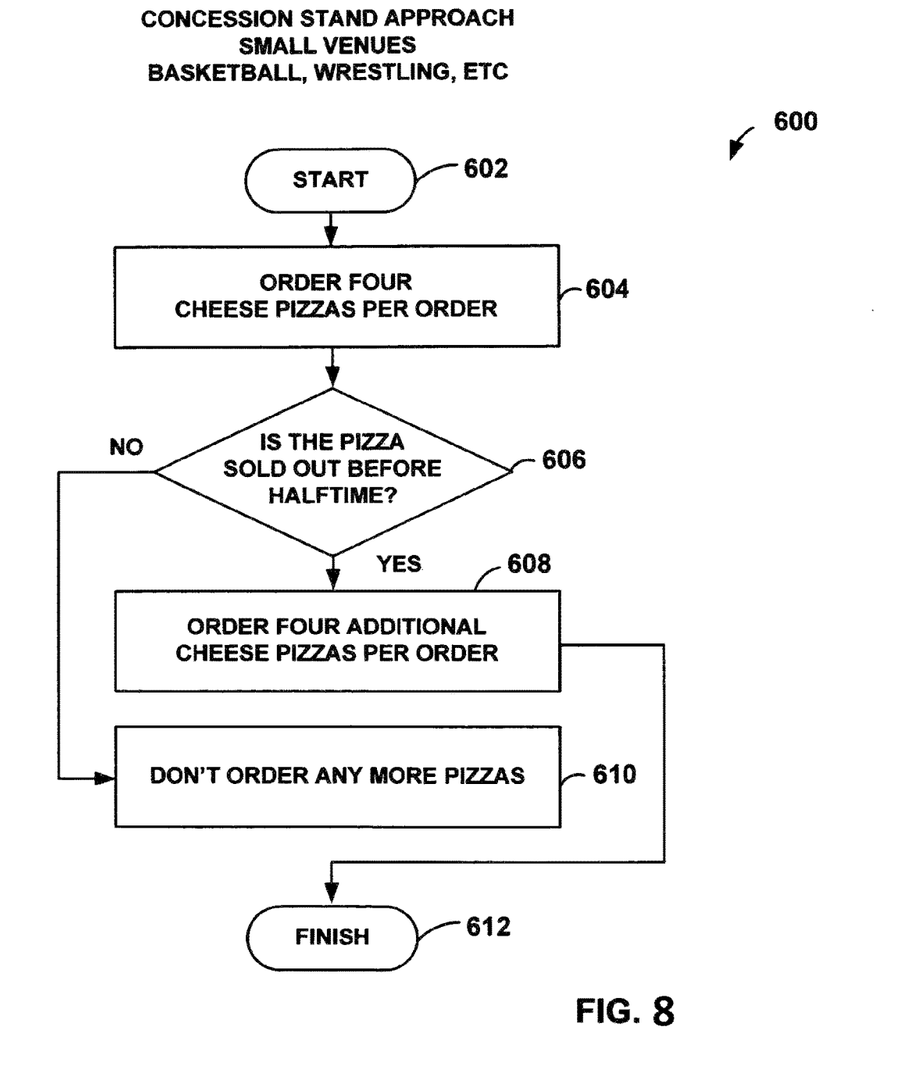

At 408 the promoter needs to educate the concession sales manager on the number of pizzas they should sell at a given event. At 410 the promoter needs to determine whether venue is large or small concession venue. If the venue is large the method 400 proceeds to FIG. 7 wherein method 400 continues as method 500. Larger venues typically involve larger sports events, like high school football games. At first be conservative in the number of pizzas ordered and offer some convenience services. If feasible purchase a large insulated bag which will cost approximately one hundred dollars. The large insulated bag should hold up to fifteen fourteen inch diameter pizzas. Lend the concession stand personnel a warmer for the evening so the concessions can keep their pizzas warm throughout the game. Offer to include or recommend that the fundraiser purchase a roller blade cutter to cut the pizzas. Even though the equal slice cutting tool will cut equal slices at the pizza shop, for example, it's natural for the cheese to glaze over, in other words the cheese runs together and has to be separated, as the pizza cools and the cheese needs to be. separated with the roller cutter. With the bag warmer the promoter can recommend a larger order. The method 500 begins at 502 and at 504 for the first game, start with an order of ten pizzas, for example. If the pizzas sell out early at 506 at a predetermined time, then re-order five more pizzas. If the pizza is not sold out at 508 and there is not enough time to sell more pizza, do not buy any more pizza at 510 and the method ends at 512. This will reduce the delivery and tip charges, reduce losses and maximize profits for the larger concession stand venue. Understand, the initial sales/games will be fact finding events. It will take a while to get the numbers right. If the venue is small proceed to FIG. 8 where method 400 continues at method 600 and begins at 602. Smaller concession venues are typically basketball and wrestling, for example, and for the small concession venue start out with four total pizzas per the first order at 604, for example. If the four pizzas sell out before the game is half over at 604, order four more at 608. On the other hand, if they last through half the game at 606, don't order more at 610 and the method ends at 612. When they sell out, they sell out, let the fundraiser make the profit and help them limit their losses.

That way you will create a long term, satisfied customer that will help you generate long term profits.

After a few games the promoter and the fundraiser will have a greater feeling for ordering. Keep in mind, weather conditions may play into the pizza sales. Rain and snow means less people will attend which means fewer slices of pizza will be sold.

Although the invention has been illustrated and described with respect to one or more embodiments, implementations, alterations, and/or modifications may be made to the illustrated examples without departing from the spirit and scope of the appended claims. In particular regard to the various functions performed by the above described components or structures (assemblies, devices, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including". "includes", "having", "has", "with", or variants thereof are used in either the detailed description and the claims, such terms are intended to be inclusive in a manner similar to the term "comprising".

What is claimed is:

1. A pizza cutting guide comprising:
   a circular base for supporting and cutting pizza,
   said base having first and second planar surfaces, at least one circular centering guide, and a plurality of self-centering cutting grooves formed in at least one of the planar surfaces that intersect to subdivide the surface into a plurality of equal sized, equally spaced pie-shaped segments to facilitate, center, and guide the movement of a cutting utensil in cutting the pizza, and
   an elongate handle extending from the base,
   wherein the base and the elongate handle define a peripheral edge,
   wherein said at least one centering guide disposed inwardly from said peripheral edge on the planar surface having said cutting grooves;
   wherein said at least one centering guide facilitates the placement of the pizza in the center of the cutting surface; and
   wherein each of said cutting grooves has terminal ends and a middle portion,
   wherein the middle portion has a uniform width and depth, and has a V-shaped cross section that that opens toward said the planar surface having said cutting grooves;
   wherein flared openings end on said peripheral edge and are widest at the peripheral edge and taper to the width of the middle portions; and
   wherein said plurality of cutting grooves are equally spaced to facilitate cutting equal size slices of pizza;
   wherein one of said cutting grooves extends on and along said elongate handle and one of its flared openings is located at an end of said elongate handle.

2. The cutting guide of claim 1, wherein the first and second planar surfaces exhibit sufficient friction to hold the food item and slices stationary during cutting, yet allow the removal by sliding of said food item and slices off of the guide.

3. The cutting guide of claim 1, wherein said plurality of cutting grooves intersect at a central point and extend radially to the edge, and wherein at least one centering guide is concentric about said intersection of the plurality of cutting grooves.

4. The cutting guide of claim 1, wherein said at least one circular centering guide comprises two centering guides, concentric with one another, wherein both centering guides are disposed inwardly from the peripheral edge.

5. The cutting guide of claim 1, wherein said at least one generally circular centering guide comprises more than two centering guides, concentric with one another, wherein all of the centering guides are disposed inwardly from the peripheral edge.

\* \* \* \* \*